July 9, 1963
W. J. MUSSLER
3,097,013
COLLAPSIBLE PORTABLE CABIN STRUCTURE FOR AUTOMOTIVE VEHICLES
Filed Aug. 8, 1960
3 Sheets-Sheet 2
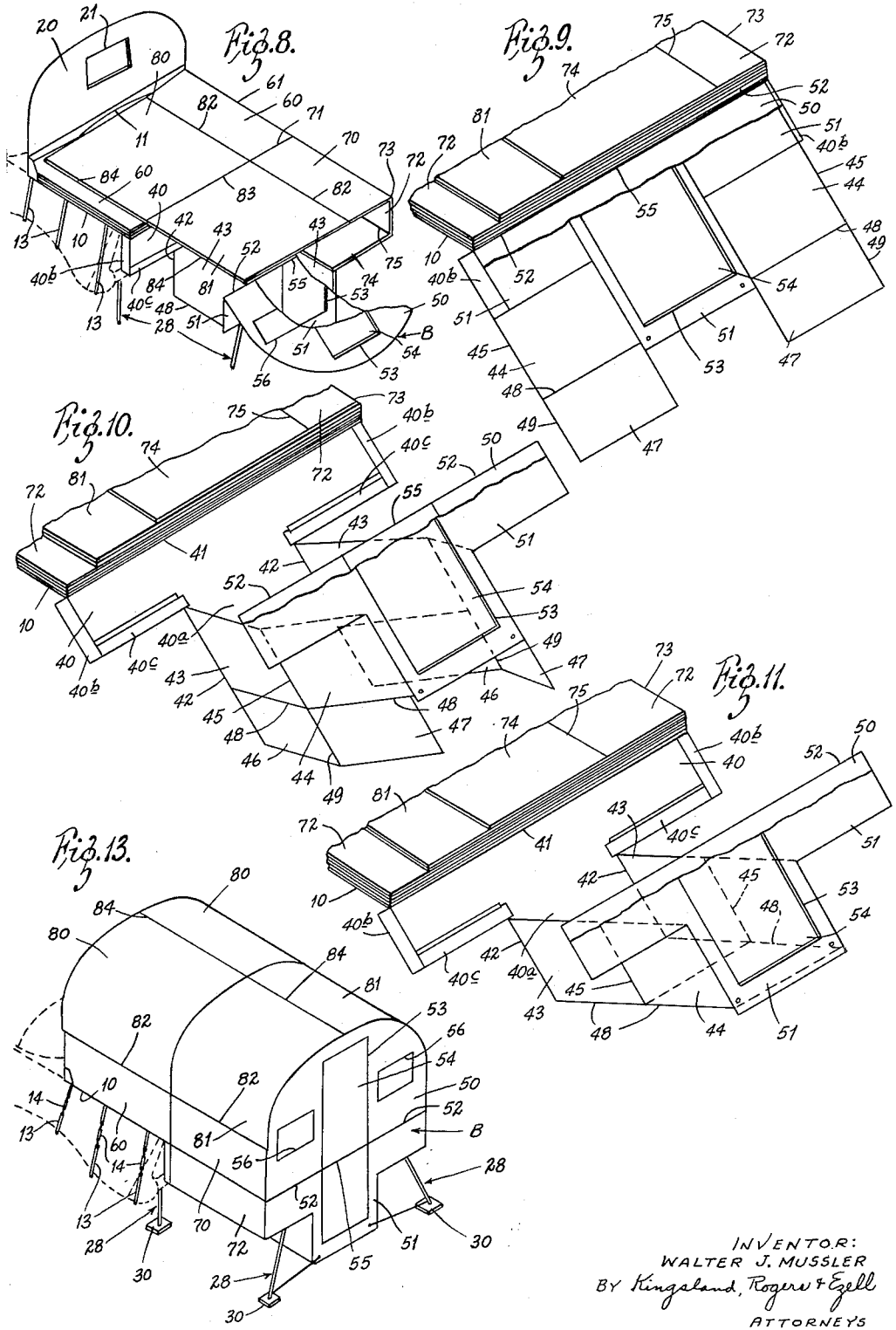
INVENTOR:
WALTER J. MUSSLER
BY Kingsland, Rogers & Ezell
ATTORNEYS

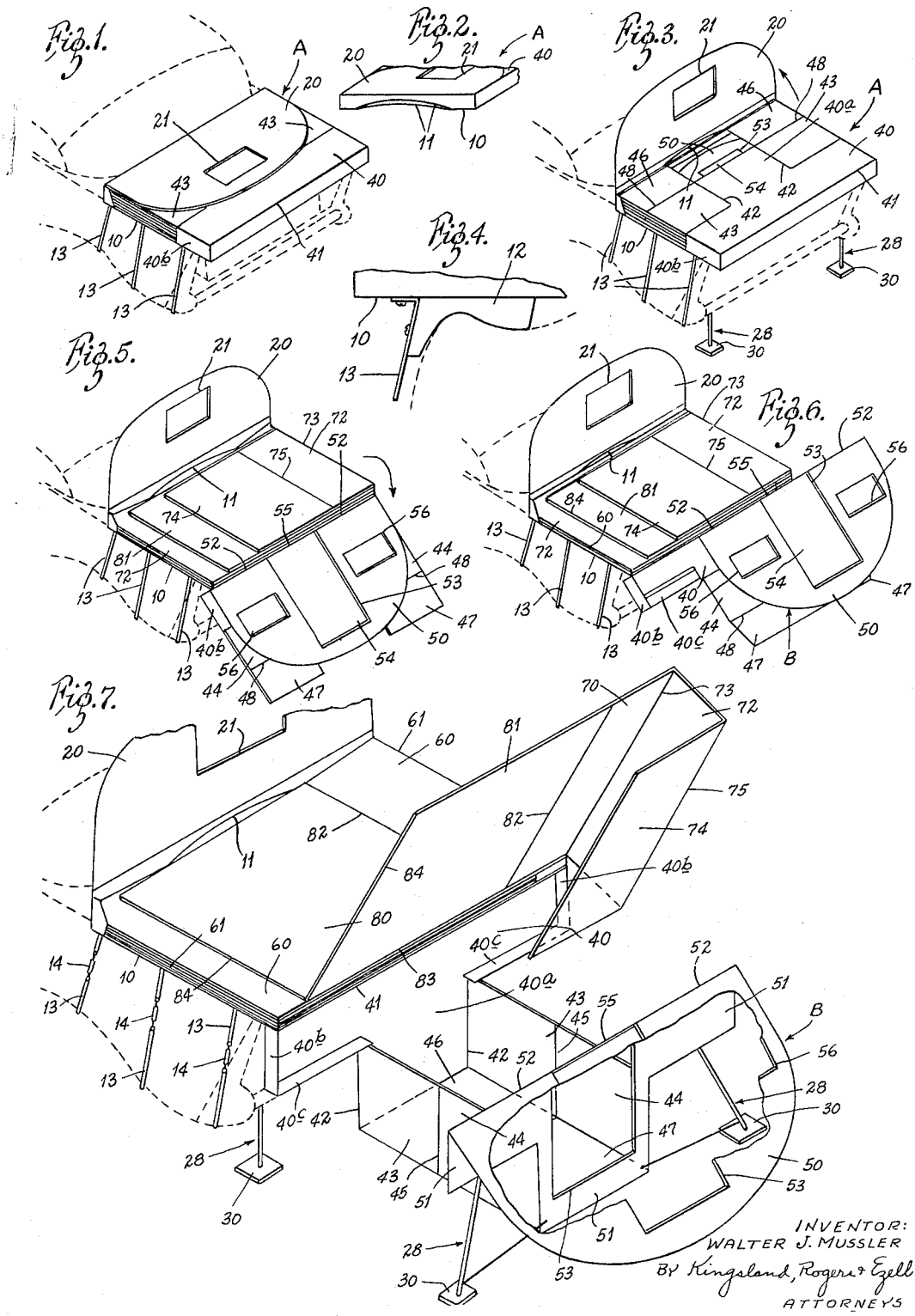

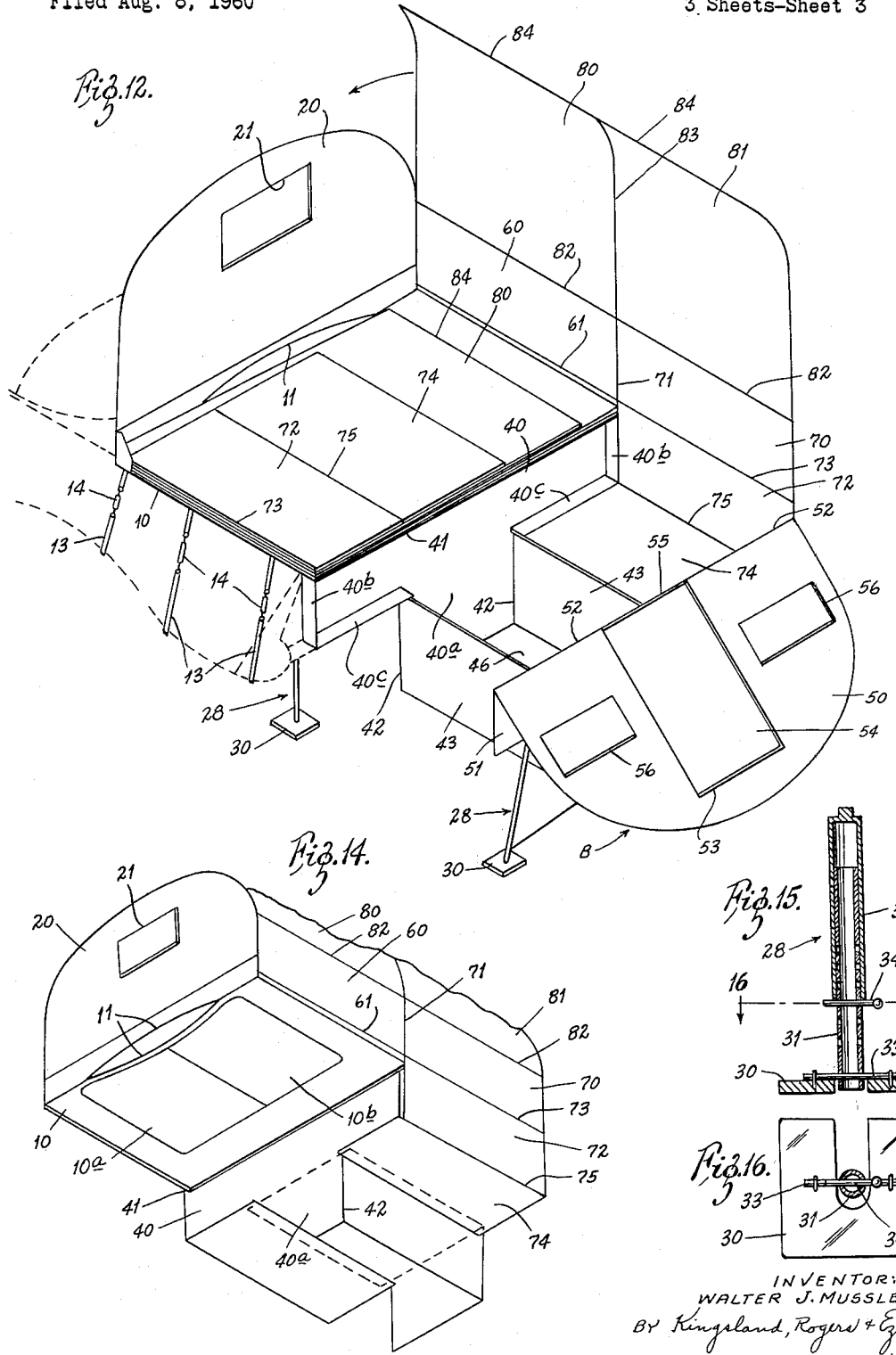

3,097,013
COLLAPSIBLE PORTABLE CABIN STRUCTURE
FOR AUTOMOTIVE VEHICLES
Walter J. Mussler, Rte. 2, Box 459, Imperial, Mo.
Filed Aug. 8, 1960, Ser. No. 48,003
8 Claims. (Cl. 296—23)

This invention relates to a collapsible structure that may be compactly folded and mounted on the top of an automobile trunk section and which may be extended to form a water-tight, cabin-type enclosure.

An object of the invention is to provide a structure, the walls of which may be folded flat with provision for mounting the structure on the conventional trunk top of an automobile, which is so arranged that it may be extended with minimum effort to provide a convenient, protective compartment having sufficient flat space to support a standard bed mattress with additional flat supports providing seats or supporting surfaces for additional pads or mattresses.

Another object of the invention is to provide a structure particularly adapted so that the floor section may be mounted flat on the surface of a trunk top, and the walls and top folded in compact parallelism, the folded structure adapted to be held in place during transport and securely held and stabilized when extended.

A further object of the invention is to provide for the structure in extended position to be supported partially by the automobile structure and partially in extended position at the rear of the automobile.

Another object of the invention is to provide for the support of the structure on the top of the trunk of an automobile in a flat-wise position by utilizing the surface of the trunk top and side supports contoured to the fins of the automobile structure in order that the part of the cabin structure may be held in horizontal position by the trunk top and a rearward extended section supported by adjustable legs.

Another object of the invention is to provide a structure, when it is in folded position, which is substantially coextensive with the trunk top of a conventional automobile with provision for an extended section foldable outwardly at the rear of the automobile to provide an enclosure that may be utilized for sleeping accommodations and also conveniently used for a table and seating.

Additional objects of the invention and advantages will be apparent from the following detailed description taken in connection with the accompanying drawings, in which:

FIG. 1 illustrates the structure in folded transport adjustment mounted on the trunk section of a conventional automobile.

FIG. 2 is a forward side elevation of the structure illustrating the manner in which the floor section at its edge is contoured to the usual convex portion of the automobile in the area of the rear window.

FIG. 3 is a view similar to FIG. 2, but additionally illustrating the support for the front section of the structure, and initial step in unfolding the collapsed assembly of parts.

FIG. 4 is a detailed view particularly illustrating means employed for leveling the forward floor section of the structure by providing blocks fitting over the fins of the automobile at each side of the trunk section, together with straps holding the structure in a stabilized position at the rear of the automobile.

FIG. 5 is a view illustrating a further sequence in the unfolding of the sections of the structure.

FIG. 6 illustrates a further step in the sequence of extending the various sections of the structure to move the rear section into place for unfolding.

FIG. 7 is a cutaway view to illustrate a further step in the erection of the structure to extended position showing the adjustable legs supporting the rear extremity of the rear section.

FIG. 8 is a view showing the rear section partially extended, with parts cut away.

FIG. 9 illustrates the lower part of the end section cut away to show the lower part of the end section, before it has been fully extended to erected adjustment.

FIG. 10 is a view particularly illustrating parts of the end section, with the central part of the end section, in partially extended position.

FIG. 11 is a further view particularly of parts of the end section.

FIG. 12 is a cutaway view to illustrates the parts constituting the side walls and the panel arrangement of the rear section partially erected.

FIG. 13 illustrates the completed exterior of the structure in extended position.

FIG. 14 is an additional cutaway view to illustrate a part of the interior of the structure after extension.

FIG. 15 is a detailed view in vertical section of the legs or supports for the bumper, and for the rear section of the structure adjustable for positioning the supports, and FIG. 16 is a cross section on the line 16—16 of FIG. 15 further illustrating the supports.

It is to be noted that many of the views appearing in the drawings are more or less schematic, and that only where possible, have thicknesses of material been illustrated. In certain views the rear end portion of an automobile is fragmentarily shown in broken lines.

By reference to the drawings, particularly FIG. 1, it will be observed that the sections of the structure comprising the floor, walls and roof may be folded in such a manner that these several elements constitute a flat, compact assembly generally designated by the reference character A.

In this adjustment, the structure may be conveniently mounted on the trunk section of a conventional automobile. Each of the panels, from which the floor and walls of the structure are made, are preferably of plywood so hinged to each other that they may be folded flat in parallelism, in order that the assembly of parts A, including roof sections preferably of flexible material such as sheet aluminum, may be conveniently handled.

The overall dimension of the assembly when folded is such that it will rest upon and overlie the trunk section of a conventional automobile with an overhanging extension at the sides and rear of this automobile trunk section.

In order to mount the assembly in a flat-wise adjustment and to firmly secure it in place for transport, the inner edge of the floor piece 10 and the adjacent section of the front wall are cut out to fit the curved lower section of the rear window section of the automobile as indicated at 11, and blocks 12 at each side are contoured to fit over the fins or crowns of the rear fenders of an automobile.

It is, of course, understood that the curvature of the fender crowns of different models of automobiles differ widely, and it is contemplated that the under surface of the blocks 12 will be formed to conform to the shape of the type of fenders of the automobile upon which the structure is to be mounted.

The upper surface of these blocks 12 is flat, and, therefore, being mounted on each side of the assembly A inwardly of the side margins thereof (FIG. 4), provide for level side supports for the floor element 10 of the assembly, the central area of which rests on the top of the automobile trunk section with the inner edge fitting against the base of the rear top section of the automobile, and the inner margin of the member 10 resting on that portion thereof inwardly of the hinge connection with the trunk top.

In order to securely attach the assembly A in place, a plurality of metal straps 13 are provided, which straps are attached at their upper ends to the under surface of the floor member 10 and may also be attached to the adjacent blocks 12. (FIG. 4). The lower ends of these straps are so formed as to fit under the bottom edge of the automobile fenders as indicated (FIG. 12). Turn buckles 14 connecting the sections of the straps 13 provide for securely holding the assembly A in place and in level adjustment.

The assembly A in folded adjustment, therefore, may be easily handled for mounting on the automobile for transport, and dismounting therefrom. The assembly A may be easily removed when not in use. In flat adjustment, the upper surface of the assembly A lies below the rear window of the automobile so that there is no obstruction of the driver's view to the rear.

The order of steps for unfolding the cabin are illustrated in stages in various ones of the figures, and, in the description that follows, the sequence of these figures may be borne in mind. Thus, the completely folded cabin is shown in FIGURE 1. The first unfolding step is shown in FIGURE 3. The second unfolding step is shown in both FIGURES 5 and 9. The next unfolding step is shown in FIGURE 6; then FIGURE 10; and then FIGURE 11. The unfolding step following the condition of FIGURE 11 is shown in FIGURE 7, and the completion of this step is shown in FIGURE 8. Next is the step shown in both FIGURES 12 and 14. The unfolding steps illustrated in FIGURES 7, 8, 12 and 14 are repeated for the left side (viewing FIGURE 12) of the cabin. Finally, the parts are brought together to produce the cabin illustrated in FIGURE 13.

The manner in which the various elements of the structure are associated will become apparent as each element is designated in the sequence that is followed in extending these various elements to erect the structure to extended adjustment as shown in FIG. 13.

The wall 20 is hinged along its lower edge to the inner edge of the floor element 10, and is the top element of the assembly A when in folded adjustment, and in extending the structure is the first member to be unfolded and brought to an upright position (FIG. 3) behind the rear of the automobile top. The upper margin is preferably curved as shown.

In alignment with the rear window of the automobile it is preferred to provide for a window 21 in member 20. As already noted, this inner wall is preferably of plywood, but it will be understood any suitable material may be used. The preferred form of hinge connection between the wall 20 and the floor member 10 is a piano-hinge type.

Before continuing the extension of the structure, by unfolding a rear extension, the rear of the automobile is stabilized by inserting under the car bumper at each side, an adjustable support 28 preferably of the type illustrated in FIGS. 15 and 16 in order to eliminate any spring action and to hold the erected structure level.

By reference to FIGS. 15 and 16 it will be observed that these supports comprise a base piece 30 upon which a tubular two-section upright is mounted, indicated by 31 and 32. The lower section has a series of openings therein, and is connected with the base by a pin 33 inserted in the opposite holes. The telescoping arrangement of the sections permits the height of the support to be adjusted so as to fit under the car bumper, and held by inserting a pin 34 through opposing openings in the member 31.

Referring to FIGURES 5 and 9, the next section to be unfolded is the rear section of the structure. This section comprises a panel 40 hinged to the rearward margin of the main floor section 10 along the line 41. As shown in FIGURE 7, this panel 40 extends across the full width of the section 10 and has a narrower extension 40a, to the side margins of which are hinged, along the lines 42 at each side, a pair of extensions 43. Another pair of extensions 44 are connected to the extensions 43, each extension 44 being hinged to the rearward edge of an extension 43 along the line 45. When the structure moves to collapsed position, these sections fold outwardly. At each side margin of the member 40 is an upturned flange 40b, and on the lower margin of the member 40 are hinged flaps 40c. The purpose of the members 40b and 40c is to provide a closure between the parts adjacent to the member 40 when the structure is extended.

A pair of panels 46 and 47 (FIGURE 10) are hinged to the lower edges of the panels 43 and 44, respectively, along a hinge line 48, and these sections 46 and 47 are likewise hinged together along a hinge line 49 and fold outwardly with the sections 43 and 44 when the structure is moved to folded adjustment. After the rear section, including the T-shaped panel 40, and the extensions 43, 44, 46 and 47 on each side of the panel 40, with other sections described immediately hereafter, is pivoted away from the trunk to the position illustrated in FIGURES 5 and 9, the hinge joints 45 connecting the panels 43 and 44 together, and the hinge joints 49 connecting the panels 46 and 47 together, are pressed inwardly, as illustrated in FIGURES 6, 10 and 11. This unfolding step is continued until the panels 43 and 44 on either side of the cabin are disposed in parallel planes, as shown in FIGURE 11. Then the panels 46 and 47, which are arranged to be moved to a horizontal position, are pivoted upwardly and inwardly, as shown in FIGURE 11, and are connected releasably at their adjacent margins to constitute the floor of the rear extended section.

The rear wall generally indicated by B (FIG. 13) includes an upper section 50, and a central downwardly extension 51. The upper section 50 is hinged to the lower section along the line 52, and folds outwardly in collapsing the structure. The upper margin of the wall 50 is curved to conform to the curved upper edge of the inner wall 20. When the extensions 43 and 44 are straightened, as described in conjunction with FIGURES 6, 10 and 11, this rear wall assumes the position illustrated in FIGURE 11.

A door opening 53 is formed centrally of the front wall, and a door 54 is hung within the opening 53. The door is preferably constructed of aluminum and comprises two sections hinged together along the line 55 in order that it may fold with the wall sections when the structure is collapsed.

Windows 56 are preferably provided in the upper section 50 of the front wall.

The next section that is unfolded in erecting the structure is that which provides the side walls of the front and rear sections, the roof member, and extensions on the side wall of the rear section to provide for forming seats at either side of that section. In the description of this step, reference may be made to FIGURES 7, 8 and 12.

The panels 60 constituting the side walls of the forward section are hinged along the line 61 at their lower edges to the side edges of the floor member 10 of the forward section. These members, when the structure is in collapsed adjustment, fold inwardly and lie in parallelism with the top face of the floor member 10.

A pair of panels 70 are hinged along the line 71 to the rear marginal edge of each of the members 60 and fold outwardly in collapsing the structure.

The roof of the structure includes at each side flexible sections 80 and 81 which are connected to the top edge of each of the panels 60 and 70, respectively, as indicated by the line 82. These sections 80 and 81 are hinged together along a line 83 and are foldable to collapsed adjustment with the panels to which they are attached. When the structure is extended, these roof sections fold inwardly and are latched together at their inner edges 84 (FIG. 13)

by any suitable latching devices, such as strap fasteners. As it is preferred to construct the roof sections of flexible aluminum sheets, they may be readily flexed into place with their inner and outer edges contacting the curve surface of the end sections 20 and 50, respectively. Any suitable fastening means for releasably securing these elements in place may be employed.

There is a depending panel 72 hinged along the line 73 to the lower edge of each of the elements 70. These panels constitute a continuation of the side wall of the rear section of the structure, and are arranged to fold inwardly against the inner face of the panels 70.

Along the lower marginal edge of each of the members 72 is a panel 74 hinged thereto along the line 75. These members 74 are arranged to be positioned horizontally between the walls 43—44 and the walls 72, thereby providing seating space at either side of the entrance aisle, or the space may be used to support mattresses, if desired.

In order to support the rear structure, a second pair of adjustable supports or legs, preferably of the type shown in FIGS. 15 and 16, are inserted and adjusted under the lower edges of the panels 51 at each side thereof, thus holding the rear section level with the forward section of the structure and elevated from the ground.

From the foregoing description, it will become apparent that a highly useful structure has been provided for convenient mounting on an automobile in a compact assembly. Further, the structure may be erected with minimum effort, and when in extended adjustment, a fully adequate enclosed living space is provided.

The forward deck or platform provided by the top surface of the floor piece 10 of the forward section provides a table, and also a support for a standard double mattress. This member 10 may have hinged sections 10a and 10b if desired, to permit access to the hinged top of the car trunk.

The rear section includes the aisle as above noted for access, with the flat sections 74 at each side. These may be used as seats or to support a pair of small mattresses, lengthwise, or by bridging across the aisle, a larger mattress may be supported crosswise.

Convenient means of entrance and exit from the interior of the structure results from the door at the end of the aisle.

While the structure has been described in some detail, is should be understood that structural departures may be made within the scope of the accompanying claims.

What is claimed is:

1. In combination with an automobile having a passenger compartment and a trunk to the rear of the passenger compartment with a rear window on the back of the passenger compartment above the trunk, a collapsible portable cabin structure for attachment over the upper side of the automobile trunk, the structure comprising a plurality of panels foldable upon one another to form a flat package of substantially less height than that of the automobile rear window, the panels including a generally horizontal first floor panel overlying the automobile trunk and having a forward edge adjacent the automobile rear window, a rear edge positioned slightly rearward of the back of the automobile, and side edges generally aligned with the sides of the automobile, a front end panel hinged to the forward edge of the first floor panel and pivotal to a substantially vertical position adjacent the automobile rear window, the front panel having side edges and a top edge, a pair of first side panels hinged to the side edges of the first floor panel, the first side panels being pivotal to substantially vertical positions into contact with the side edges of the front end panel, a depending panel hinged to the rear edge of the first floor panel and pivotal to a substantially vertical position depending downwardly from the first floor panel opposite the rear end of the automobile, the depending panel having side edges, second side panels hinged to the side edges of the depending panel and extending rearwardly thereof, second floor panels hinged to the lower edges of the second side panels, the second floor panels being pivotal into substantially horizontal positions in contact with the bottom edge of the depending panel, a rear end panel hinged to the second side panels and having a lower edge in contact with the second floor panels, the rear end panel having a top edge, a forward roof panel assembly comprising first roof panels fastened to the upper edges of the first side panels and having forward edges in contact with the top edge of the front end panel, a rearward roof panel assembly comprising second roof panels hinged to the rear edges of the first roof panels and having rearward edges in contact with the top edge of the rear end panel, the second roof panels including panel means extending to the upper edges of the second side panels.

2. The combination of claim 1 with releasable means to lock the first floor panel to the automobile.

3. The combination of claim 1 wherein the top edges of the front and rear end panels are curved and the roof panels are flexible to follow the curved top edges of the end panels.

4. The combination of claim 1 wherein the side edges of the depending panel and the rear end panel are spaced apart a distance sufficiently wide to provide a human passageway, but are closer together than the side edges of the first floor panel, the depending and rear end panels having horizontal edges extending from their side edges to points in line with the first floor panel side edges, the depending and rear end panels also having extreme side edges extending vertically upwardly from the horizontal edges, the panel means including hinged panels extending from the second roof panels to the second side panels.

5. The combination of claim 1 including an opening through the front end panel opposite the automobile rear window and a door through the rear end panel directly above the second floor panels.

6. The combination of claim 1 wherein the releasable means comprise straps connected at one end to the first floor panel and at the other end to selected points of the automobile, and means to adjust the length of each strap.

7. The combination of claim 1 with legs between the ground and the underside of the automobile rearward of the wheels, and means to adjust the height of the legs.

8. The combination of claim 1 with door means through the first floor panel to provide access to the automobile trunk.

References Cited in the file of this patent

UNITED STATES PATENTS

| 1,850,638 | Schioler | Mar. 22, 1932 |
| 1,984,681 | Jackson | Dec. 18, 1934 |
| 2,459,026 | Hardy | Jan. 11, 1949 |
| 2,502,061 | Radford | Mar. 28, 1950 |
| 2,718,015 | Fisk | Sept. 20, 1955 |
| 2,863,178 | Hagen | Dec. 9, 1958 |
| 2,883,713 | Zug | Apr. 28, 1959 |

FOREIGN PATENTS

| 174,813 | Austria | May 11, 1953 |
| 180,489 | Austria | Dec. 10, 1954 |